Patented Dec. 19, 1933

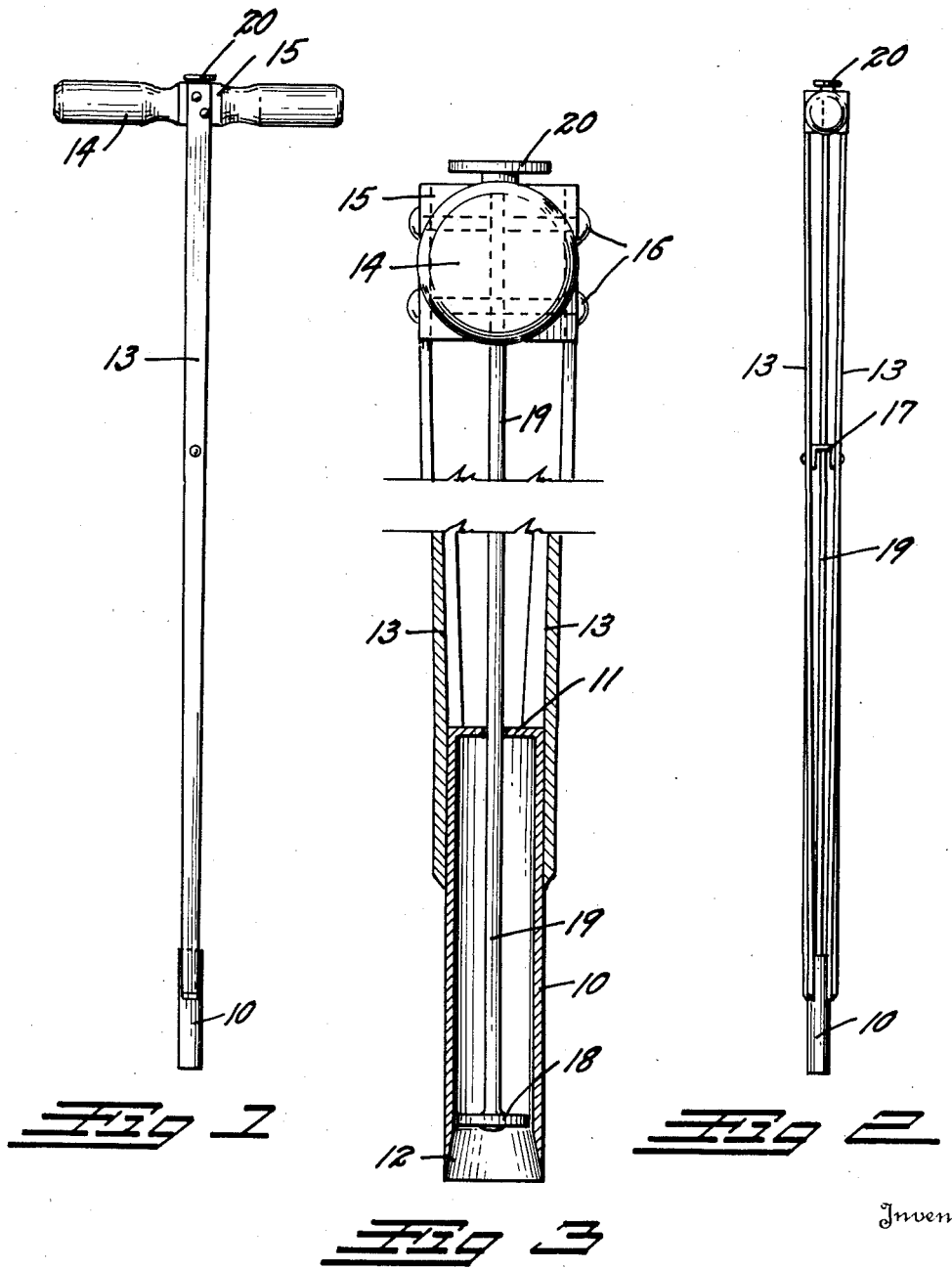

1,939,897

UNITED STATES PATENT OFFICE 1,939,897

DANDELION DIGGER

Francis S. Hill, Denver, Colo.

Application June 28, 1932. Serial No. 619,670

1 Claim. (Cl. 55—18)

This invention relates to a device for pulling noxious weeds, more particularly dandelions of the type which infest lawns.

The principal object of the invention is to provide a puller of this type which will, when pushed down around the root of the weed, or dandelion, firmly grip the root so that it may be withdrawn from the earth for its entire length.

Another object of the invention is to so construct the device that the pulled root can be quickly and easily expelled therefrom into any desired collector or container.

A further object is to provide a weed puller which can be operated in the standing position so that it will not be necessary to kneel, bend, or stoop.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front view of the improved weed puller.

Fig. 2 is a side view thereof.

Fig. 3 is a substantially full size fragmentary view illustrating an end view of the handle portion and a vertical section through the digging portion of the improved puller.

The invention comprises a vertical tube 10, a diameter to slightly exceed the diameter of the average dandelion roots. The upper edge of the tube 10 is preferably closed by means of a head 11. The lower extremity of the tube 10 is sharpened with an inward bevel as shown at 12. The tube 10 is soldered, brazed, welded, or otherwise secured to the lower extremity of two strap irons 13 which extend upwardly to each side of a handle 14.

The handle 14 is preferably formed with a square cross section at the center as shown at 15, to receive the two strap irons 13. The latter may be secured thereto by means of suitable rivets 16. A stiffening brace 17 is riveted between the strap irons 13 at approximately their middle point to provide a stiffening truss structure.

It will be noted that an expelling plunger 18 is positioned within the tube 10 upon the lower extremity of a plunger rod 19 which extends through the head 11, through the stiffening brace 17, and through the handle 14 terminating in a thumb button 20 at its upper extremity.

In use, the operator grasps the handle 14 in both hands and positions the tube 10 over the center or root portion of a dandelion and pushes the device downwardly. This causes the sharpened lower edge of the tube to cut off the leaves of the dandelion plant and pass downwardly over the root thereof. As it moves downwardly, the plunger 18 will rest upon the plant and move into the tube therewith.

When the operator lifts the device, the frictional engagement of the root and its surrounding plug of earth will cause it to be pulled upwardly so that the entire root can be withdrawn and lifted from the ground. The operator then places the tube extremity of the puller in his gathering basket or container and presses upon the thumb button 20 with his thumb. This causes the plunger 18 to eject the root and its attached plug of earth from the device into the basket and it is again ready for use.

It is desired to call particular attention to the inward bevel 12 on the lower extremity of the tube. This bevel is very important and makes the present digger successful where all similar diggers have failed. Owing to the relatively larger internal diameter at the bottom of the tube, it will outline an earthen plug of a larger diameter than the internal diameter of the tube 10. As the tube is pressed downwardly, it will act to compress this plug inwardly to the internal diameter of the tube 10. This compressive action upon the plug causes it to exert an expansive action upon the tube which greatly facilitates the gripping or frictional engagement with the tube so that the longest dandelion roots can be pulled with ease without danger of the plug slipping from the tube.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

A dandelion digger comprising; a vertical tube; an outwardly flared portion on the lower extremity of the inner wall of said tube; a head in the upper extremity of said tube; handle members secured to opposite sides of said tube and extending parallelly upward therefrom; a horizontally positioned handle secured between said handle members; a plunger in said tube; a plunger rod extending upwardly from said plunger between said handle members and through said head and through said handle; and an operating button secured on the upper extremity of said plunger rod above said handle; and a stiffening brace secured between said handle members intermediate their extremities, said plunger rod extending through said brace.

FRANCIS S. HILL.